United States Patent Office 3,528,083
Patented Sept. 8, 1970

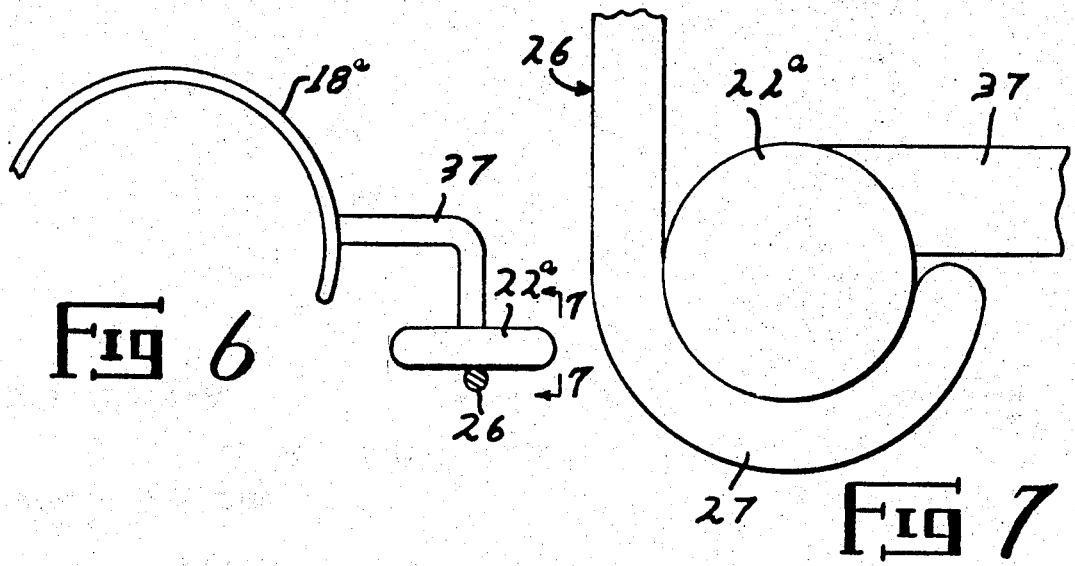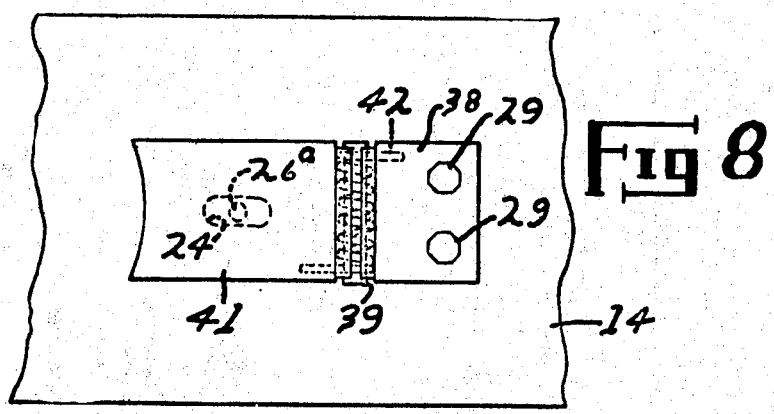

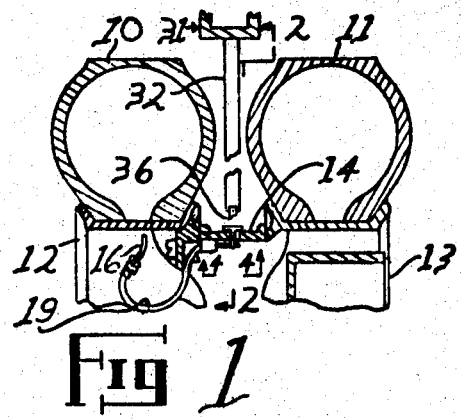
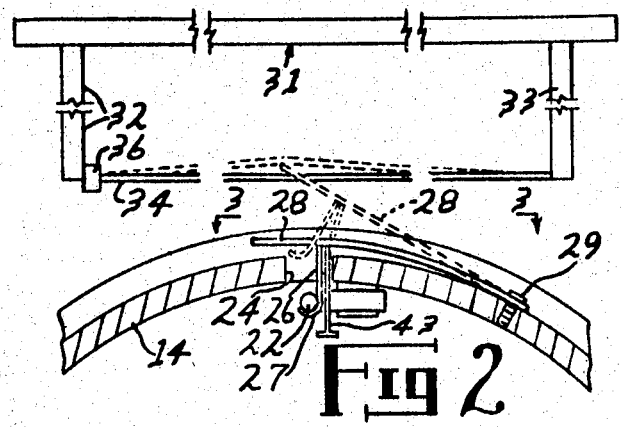
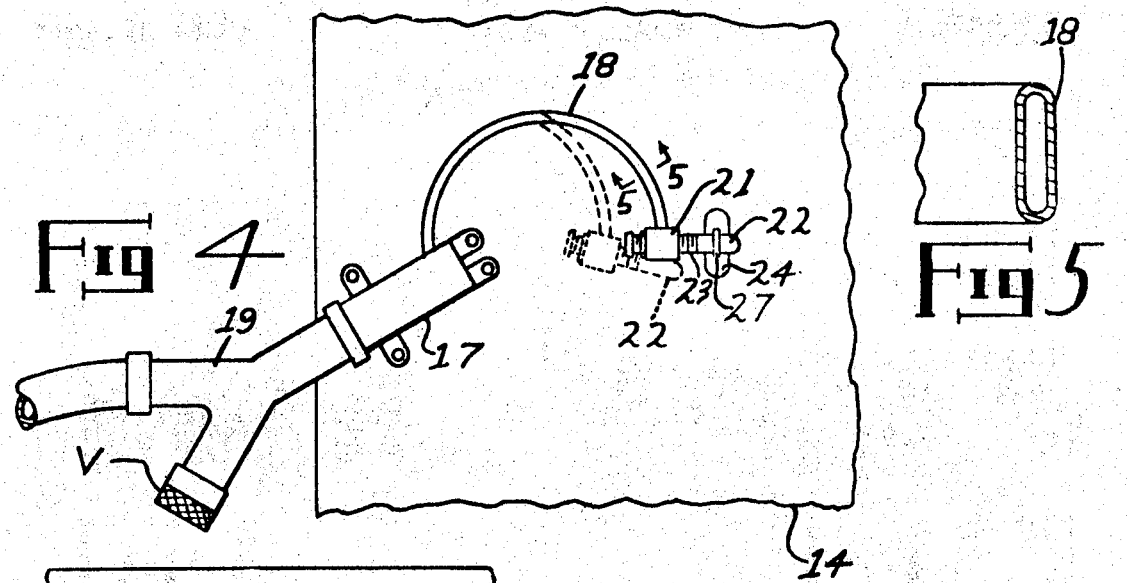
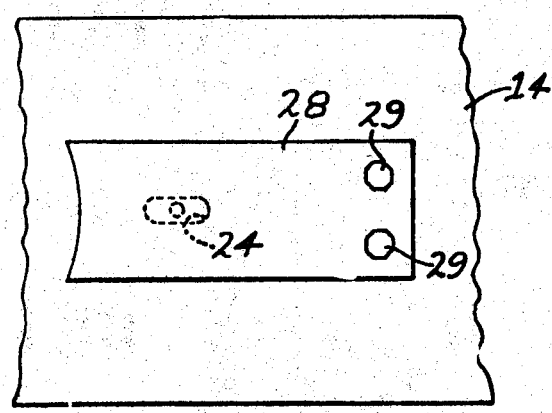

3,528,083
PRESSURE WARNING APPARATUS FOR PNEUMATIC TIRE
Hugh M. Parker, 718 Cherokee St., Talladega, Ala. 35160
Filed Mar. 7, 1968, Ser. No. 711,355
Int. Cl. B60c 23/02
U.S. Cl. 116—34                                 9 Claims

ABSTRACT OF THE DISCLOSURE

Pressure warning apparatus having a pressure actuated movable element carried by a wheel unit and connected to a pneumatic tire and movable to selected positions in response to pressure differentials in the tire. An actuating member carried by the wheel unit is held in inoperative position by the movable element until there is a predetermined change in pressure in the tire whereupon the actuating member is then released and moves outwardly to actuate a warning device.

BACKGROUND OF THE INVENTION

This invention relates to pressure warning apparatus for pneumatic tires and more particularly to such apparatus which shall be adapted for use in association with pneumatic tires of motor driven trucks and other types of motor driven vehicles for signaling an imbalance of air pressure within the tires thus preventing damage to the tires through operating at pressures above or below those for which the tires are designed. My improved apparatus is particularly adapted for use with dual mounted vehicle tires whereby the operator is warned of over-inflation or under-inflation of the tires.

Heretofore in the art to which my invention relates, various devices have been proposed for warning the operator of a motor driven vehicle that a tire is over inflated or under inflated. Such devices have been complicated in structure and are easily damaged by grit, dirt, water and the like during normal operation. Also, many prior art devices are not operable with dual wheels of vehicles due to the fact that such devices are dependent upon outward movement of the sides of the tires upon deflation of the tire.

BRIEF SUMMARY OF INVENTION

In accordance with my invention, a pressure actuated movable element is mounted on the wheel unit in communication with the pneumatic tire so that it is movable to selected positions in response to pressure differentials within the tire. A spring actuated member is carried by the wheel unit and is held in inoperative position by the movable element until there is a predetermined change in pressure within the tire whereby the actuating member is then released and moves outwardly to actuate a warning device.

Apparatus embodying features of my invention is illustrated in the accompanying drawings, forming a part of this application, in which:

FIG. 1 is an enlarged view showing my improved apparatus mounted between dual mounted vehicle tires;

FIG. 2 is an enlarged sectional view taken generally along the line 2—2 of FIG. 1;

FIG. 3 is an enlarged, fragmental view taken generally along the line 3—3 of FIG. 2;

FIG. 4 is an enlarged view taken generally along the line 4—4 of FIG. 1;

FIG. 5 is an enlarged, fragmental sectional view taken generally along the line 5—5 of FIG. 4;

FIG. 6 is a fragmental view showing a modified form of my invention;

FIG. 7 is an enlarged, fragmental view taken generally along the line 7—7 of FIG. 6; and FIG. 8 is a fragmental view corresponding to FIG. 3 but showing another form of my invention.

Referring now to the drawings for a better understanding of my invention, I show dual mounted pneumatic tires 10 and 11 mounted on wheels 12 and 13 which are connected to each other by a conventional type sleeve connector 14. Each wheel 12 and 13 is provided with a conventional tire valve 16 which is preferably spaced from each other so as to aid in balancing the overall wheel assembly. The tire valve 16 for the wheel 13 is not shown and in view of the fact that both tire valves are identical in structure, no further description thereof is deemed necessary.

Mounted on the inner surface of the sleeve connector 14 is a pressure responsive device 17 having a pressure actuated movable member 18. Preferably, the pressure responsive device and movable element 18 is of the type having a curved conduit which is generally flat, as viewed in cross section, as shown in FIG. 5. One end of the movable conduit 18 is mounted on the housing for the pressure responsive device 17 and communicates with the pneumatic tire 10 by a conduit 19 which is connected to the tire valve 16, as shown in FIG. 1. The other or free end of the curved conduit 18 is adapted to move toward a straight position, as shown in solid lines in FIG. 4, upon an increase in pressure within the tubular member 18. Accordingly, upon a decrease in pressure within the movable, tubular member 18, it moves toward the dotted line position shown in FIG. 4. Mounted at the outer free end of the movable element 18, on a suitable bracket 21, is a laterally projecting movable element 22. Preferably, the movable element 22 is provided with threads 23 which engage internal threads carried by the bracket 21 whereby the position of the movable element 22 relative to the free end of the curved movable member 18 may be adjusted.

As shown in FIGS. 2, 3 and 4, an elongated opening 24 is provided in the sleeve connector 14 for receiving the inner end of a latch member 26 having a hook-like latch element 27 which is adapted to engage the inner surface of the latch element 22, as shown in FIGS. 2 and 4. The other end of the latch member 26 is connected to a spring actuated member 28 which is secured to the sleeve connector 14 of the overall wheel unit by suitable means, such as cap screws 29. In FIGS. 1 through 3, I show the spring actuated member 28 as being in the form of a leaf spring which is anchored at one end by the securing screws 29 to the sleeve connector of the wheel unit. That is, the tension in the leaf spring forming the member 28 urges the member 28 toward the dotted line position shown in FIG. 2 upon release of the hook member 27 from the movable element 22. With the desired pressure in the pneumatic tire, the pressure within the curved conduit 18 tends to straighten the conduit whereby it moves to the solid line position shown in FIG. 4. On the other hand, upon a decrease in pressure in the tire 10 and the curved member 18, the curved member 18 moves to the dotted line position shown in FIG. 4 whereupon the movable element 22 moves out of engagement with the hook element 27 to thus release the spring actuated member 28 whereby it moves outwardly to the dotted line position shown in FIG. 2.

Mounted on and depending from a stationary part of the vehicle indicated at 31 are a pair of support members 32 and 33. As shown in FIG. 1, the depending members 32 and 33 are in alignment with the opening 24 in the sleeve connector 14 for the overall wheel unit. Secured to the lower ends of the support brackets 32 and 33 is a flexible member 34 which is in position to be engaged by the spring actuated member 28 upon movement thereof to the dotted line position shown in FIG. 2. A switch element 36 is carried by the lower end of the support bracket 32 and is connected to the adjacent end of the flexible member 34 whereby upon movement of the member 34 to the dotted line position shown in FIG. 2, the switch element 36 is actuated to energize a signal device which may be in the form of a light, buzzer, flag or the like which is in easy view of the operator of the vehicle. In view of the fact that such signal devices are well known in the art, no further description thereof is deemed necessary. That is, the switch element 36 is a signal actuating device which is operatively connected to the desired signal such as a light, buzzer, flag or the like.

In FIGS. 6 and 7 of the drawings, I show a modified form of my invention with a curved conduit 18a identical to curved conduit 18, connected to an L-shaped bracket 37 which in turn is connected to a movable element 22a which replaces the movable element 22. The inwardly projecting latch member 26 extends inwardly through the opening 24 in the sleeve connector 14, as described hereinabove, and the inner, hook-like portion 27 thereof extends beneath the movable element 22a, as shown in FIG. 7. Accordingly, the movable element 22a is adapted to move axially relative to the hook-like portion 27. Accordingly, upon an increase in pressure the curved element 18a tends to straighten out to thus move the movable element toward the right, as viewed in FIG. 6, whereupon the movable element 22a moves out of engagement with the hook-like member 26. On the other hand, upon a decrease in pressure within the tire, the curved member 18a moves toward a contracted position to thus move the movable element 22a toward the left, as viewed in FIG. 6. This causes the movable element 22a to disengage the hook-like member 27 at the opposite end of the movable element 22a from the end thereof disengaged when the pressure is increased within the curved movable member 18a. Accordingly, upon a predetermined increase in pressure within the tire and the curved member 18a, the elongated movable element 22a moves in one direction to disengage the hook-like member 27 upon a predetermined increase in pressure. On the other hand, upon a predetermined decrease in pressure, the curved member 18a moves toward the left to disengage the movable element 22a from the hook-like member 27. Accordingly, the latch member 26 is released and the spring actuated member 28 moves to the dotted line position shown in FIG. 2 upon a predetermined increase or decrease in pressure within the curved member 18a and the pneumatic tire in communication therewith.

In FIG. 8 of the drawings, I show a further modified form of my invention in which a bracket 38 is mounted on the sleeve connector 14 by the cap screws 29. Pivotally connected to the bracket 38 by a pivot pin 39 is an elongated member 41 which in turn is connected to an inwardly extending latch member 26a which is identical to the latch element 26 described hereinabove which passes through the elongated opening 24 provided in the sleeve connector 14. A torsion spring 42 surrounds the pivot pin 39 and is interposed between the bracket 38 and the elongated member 41 whereby the elongated member 41 is urged outwardly of the sleeve connector 14 whereupon it is adapted to move to a position corresponding to the dotted line position of the spring actuated member 28 in FIG. 2. Accordingly, the spring actuated member 41 operates in a manner identical to the operation of the leaf spring member 28 described hereinabove.

From the foregoing description, the operation of my improved apparatus will be readily understood. The elongated movable element 22 is adjusted relative to its bracket 21 whereby it disengages the hook portion 27 of latch element 26 at a predetermined decrease in pressure. The tire 10 is inflated by introducing air through a conventional type filling valve indicated generally at V whereby the pressure responsive device 17 and its curved conduit 18 is in direct communication with the pneumatic tire 10. To facilitate movement of the spring actuated member 28 inwardly, an inwardly extending pull member 43 may be connected to the inner surface of the elongated member 28, as shown in FIG. 2. Upon pulling the member 43 inwardly, the hook portion 27 moves beneath the laterally extending movable element 22, as shown in FIG. 2 whereby the spring actuated member 28 is held in the solid line position until there is a predetermined decrease in pressure within the curved conduit 18 and the tire in communication therewith. Upon a predetermined decrease in pressure within the curved conduit 18, the movable element 22 moves out of engagement with the hook portion 27 whereby the latch element is released to thus permit the spring member 28 to move to the dotted line position shown in FIG. 2 whereupon the flexible member 34 is moved upwardly to the dotted line position to actuate the signal actuating device 36. The operator of the vehicle is then warned that the tire is deflated to a predetermined pressure.

If it is desired to warn the operator where there is either a decrease or an increase in pressure, the elongated movable element 22a is provided whereby the latch element 26 is adapted to disengage opposite ends of the movable element 22a upon a predetermined increase or decrease in pressure, respectively.

While I have shown the spring actuated member as being in the form of a leaf spring or actuated by a torsion spring, it will be apparent that other forms of spring actuated devices may be employed to urge the elongated spring actuated member into engagement with the flexible member 34 upon release thereof.

While I have shown my invention in several forms, it will be obvious to those skilled in the art that it is not so limited, but is susceptible of various other changes and modifications without departing from the spirit thereof.

What I claim is:

1. In pressure warning apparatus for a pneumatic tire mounted on the wheel unit of a vehicle:
   (a) a pressure actuated movable element comprising a curved, tubular member closed at one end with the other end thereof mounted on said wheel unit and disposed to move toward a straightened position upon an increase in pressure within said tubular member,
   (b) means communicating said one end of said tubular member with said tire so that said element moves to selected positions in response to differentials in pressure within said tire,
   (c) a spring actuated member carried by said wheel unit movable selectively to an inner position and an outer position and urged toward said outer position by spring tension,
   (d) releasable means comprising a first latch element carried by said spring actuated member and a second latch element carried by said one end of the tubular member movable into engagement with said first latch element while a predetermined pressure exists within said tubular member and movable out of engagement with said first latch element upon a predetermined change in pressure within said tubular member whereby said spring actuated member is held at said inner position under spring tension and is released upon a predetermined change in pressure in said tire to move said pressure actuated element to a position to release said spring actuated member for outward movement, and
   (e) a signal actuating device carried by the vehicle in position to be engaged by said spring actuated member upon outward movement thereof whereby said signal actuating device is actuated upon said predetermined change in pressure within said tire.

2. Pressure warning apparatus as defined in claim 1 in which said second latch element is a laterally extending member adjustably connected to said one end of said tubular member.

3. Pressure warning apparatus as defined in claim 1 in which said second latch element is of a length and extends in a direction to slidably engage said first latch element so that said second latch element moves out of engagement with said first latch element upon a predetermined increase or decrease in pressure within said tubular member.

4. Pressure warning apparatus as defined in claim 1 in which said spring actuated member comprises:
   (a) an elongated member operatively connected adjacent one end to said wheel unit with the other end of said elongated member adapted for movement inwardly and outwardly of said wheel unit and urged outwardly by spring tension, and
   (b) means connecting said elongated member to said first latch element.

5. Pressure warning apparatus as defined in claim 4 in which said elongated member is a leaf spring connected adjacent said one end to the wheel unit.

6. Pressure warning apparatus as defined in claim 4 in which said elongated member is pivotally connected to said wheel unit and a spring member is interposed between said elongated member and said wheel unit to urge said other end of the elongated member outwardly.

7. In pressure warning apparatus for a pneumatic tire mounted on the wheel unit of a vehicle:
   (a) an annular sleeve-like member mounted on said wheel unit adjacent said tire,
   (b) a pressure actuated movable element mounted on the inner surface of said sleeve-like member,
   (c) means communicating said pressure actuated movable element with said tire so that said element moves to selected positions in response to differentials in pressure within said tire,
   (d) an elongated spring actuated member operatively connected adjacent one end to said wheel unit with the other end of said elongated member adapted for movement inwardly and outwardly of said wheel unit selectively to an inner position and an outer position and urged toward said outer position by spring tension,
   (e) an elongated latch element connected to the inner surface of said elongated spring actuated member and extending inwardly of said sleeve-like member,
   (f) there being a passageway through said sleeve-like member for receiving said elongated latch element,
   (g) a hook-like member carried by the inner end of said elongated latch element disposed to slidably and releasably engage said pressure actuated movable element holding said spring actuated member at said inner position under spring tension and releasable upon a predetermined change in pressure in said tire to move said pressure actuated movable element to a position to release said spring actuated member for outward movement, and
   (e) a signal actuating device carried by the vehicle in position to be engaged by said spring actuated member upon outward movement thereof whereby said signal actuating device is actuated upon said predetermined change in pressure within said tire.

8. Pressure warning apparatus as defined in claim 7 in which a flexible pull member extends through said passageway in said sleeve-like member and is connected at its outer end to said elongated member for moving said elongated member inwardly toward said sleeve-like member so that said hook-like member is detachably connected to said pressure actuated element.

9. Pressure warning apparatus as defined in claim 1 in which said signal actuating device comprises an elongated member extending between spaced apart supports carried by said vehicle.

References Cited
UNITED STATES PATENTS

| | | | |
|---|---|---|---|
| 984,453 | 2/1911 | Terpening | 340—53 |
| 2,063,871 | 12/1936 | French | 116—34 XR |
| 2,570,108 | 10/1951 | Gallot et al. | 116—34 |
| 2,620,762 | 12/1952 | Benz | 116—34 |
| 2,710,391 | 6/1955 | Trinca | 200—61.25 XR |
| 3,181,184 | 4/1965 | Perry | 73—146.2 XR |
| 3,222,642 | 12/1965 | Berill | 200—61.25 XR |
| 3,235,684 | 2/1966 | Jordan et al. | 116—34 XR |
| 3,252,135 | 5/1966 | Amundsen | 200—61.25 XR |

LOUIS J. CAPOZI, Primary Examiner

U.S. Cl. X.R.

73—146.2; 200—61.25

UNITED STATES PATENT OFFICE
CERTIFICATE OF CORRECTION

Patent No. 3,528,083                                   September 8, 1970

Hugh M. Parker

It is certified that error appears in the above identified patent and that said Letters Patent are hereby corrected as shown below:

Column 5, lines 10 to 46 and Column 6, lines 1 to 27 should be deleted, and the following inserted instead therefore:

4. Pressure warning apparatus as defined in claim 1 in which said signal actuating device comprises an elongated member extending between spaced apart supports carried by said vehicle.
    5. Pressure warning apparatus as defined in claim 1 in which said spring actuated member comprises:
        (a) an elongated member operatively connected adjacent one end to said wheel unit with the other end of said elongated member adapted for movement inwardly by spring tension, and
        (b) means connecting said elongated member to said first latch element.
    6. Pressure warning apparatus as defined in claim 5 in which said elongated member is pivotally connected to said wheel unit and a spring member is interposed between said elongated member and said wheel unit to urge said other end of the elongated member outwardly.
    7. Pressure warning apparatus as defined in claim 6 in which a flexible pull member extends through said passageway in said sleeve-like member and is connected at its outer end to said elongated member for moving said elongated member inwardly toward said sleeve-like member so that said hook-like member is detachably connected to said pressure actuated element.
    8. In pressure warning apparatus for pneumatic tire mounted on the wheel unit of a vehicle:
        (a) a pressure actuated movable element carried by said wheel unit,
        (b) means communicating said pressure actuated movable element with said tire so that said element moves to selected positions in response to differentials in pressure within said tire,
        (c) a leaf spring connected adjacent one end to said wheel unit with the other end of said leaf spring adapted for movement inwardly and outwardly of said wheel unit selectively to an inner position and an outer position and urged outwardly by spring tension, (d) means releasably connecting said leaf spring to said pressure actuated movable element holding said leaf spring at said inner position under spring tension and releasable upon a predetermined change in pressure in said tire to move said pressure actuated movable element to a position to release said leaf spring for outward movement, and (e) a signal actuating device carried by the vehicle in position to be engaged by said leaf spring upon outward movement thereof whereby said signal actuating device is actuated upon said predetermined change in pressure within said tire.

9. In pressure warning apparatus for a pneumatic tire mounte on the wheel unit of a vehicle:

(a) an annular sleeve-like member mounted on said wheel unit adjacent said tire, (b) a pressure actuated movable element mounted on the inner surface of said sleeve-like member, (c) means communicating said pressure actuated movable element with said tire so that said element moves to selected positions in response to differentials in pressure within said tire, (d) an elongated spring actuated member operatively connected adjacent one end to said wheel unit with the other end of said elongated member adapted for movement inwardly and outwardly of said wheel unit selectively to on inner position and an outer position and urged toward said outer position by spring tension, (e) an elongated latch element connected to the inner surface of said elongated spring actuated member and extending inwardly of said sleeve-like member, (f) there being a passageway through said sleeve-like member for receiving said elongated latch element, (g) a hook-like member carried by the inner end of said elongated latch element disposed to slidably and releasably engage said pressure actuated movable element holding said spring actuated member at said inner position under spring tension and releasable upon a predetermined change in pressure in said tire to move said pressure actuated movable element to a position to release said spring actuated member for outward movement, and (h) a signal actuating device carried by the vehicle in position to be engaged by said spring actuated member upon outward movement thereof whereby said signal actuating device is actuated upon said predetermined change in pressure within said tire.

Signed and sealed this 13th day of April 1971.

SEAL)
ttest:

DWARD M. FLETCHER, JR.
ttesting Officer

WILLIAM E. SCHUYLER, JR
Commissioner of Patents

UNITED STATES PATENT OFFICE
CERTIFICATE OF CORRECTION

Patent No. 3,528,083      Dated September 8, 1970

Inventor(s) Hugh M. Parker

It is certified that error appears in the above-identified patent and that said Letters Patent are hereby corrected as shown below:

Column 5, lines 10 to 46 and Column 6, lines 1 to 27 should be deleted, and the following inserted instead therefore:

-- 4. Pressure warning apparatus as defined in claim 1 in which said signal actuating device comprises an elongated member extending between spaced apart supports carried by said vehicle.

5. Pressure warning apparatus as defined in claim 1 in which said spring actuated member comprises:
    (a) an elongated member operatively connected adjacent one end to said wheel unit with the other end of said elongated member adapted for movement inwardly and outwardly of said wheel unit and urged outwardly by spring tension, and
    (b) means connecting said elongated member to said first latch element.

6. Pressure warning apparatus as defined in claim 5 in which said elongated member is pivotally connected to said wheel unit and a spring member is interposed between said elongated member and said wheel unit to urge said other end of the elongated member outwardly.

7. Pressure warning apparatus as defined in claim 6 in which a flexible pull member extends through said passageway in said sleeve-like member and is connected at its outer end to said elongated member for moving said elongated member inwardly toward said sleeve-like member so that said hook-like member is detachably connected to said pressure actuated element.

8. In pressure warning apparatus for pneumatic tire mounted on the wheel unit of a vehicle:

(a) a pressure actuated movable element carried by said wheel unit, (b) means communicating said pressure actuated movable element with said tire so that said element moves to selected positions in response to differentials in pressure within said tire, (c) a leaf spring connected adjacent one end to said wheel unit with the other end of said leaf spring adapted for movement inwardly and outwardly of said wheel unit selectively to an inner position and an outer position and urged outwardly by spring tension, (d) means releasably connecting said leaf spring to said pressure actuated movable element holding said leaf spring at said inner position under spring tension and releasable upon a predetermined change in pressure in said tire to move said pressure actuated movable element to a position to release said leaf spring for outward movement, and (e) a signal actuating device carried by the vehicle in position to be engaged by said leaf spring upon outward movement thereof whereby said signal actuating device is actuated upon said predetermined change in pressure within said tire.

9. In pressure warning apparatus for a pneumatic tire mounted on the wheel unit of a vehicle:

(a) an annular sleeve-like member mounted on said wheel unit adjacent said tire, (b) a pressure actuated movable element mounted on the inner surface of said sleeve-like member, (c) means communicating said pressure actuated movable element with said tire so that said element moves to selected positions in response to differentials in pressure within said tire, (d) an elongated spring actuated member operatively connected adjacent one end to said wheel unit with the other end of said elongated member adapted for movement inwardly and outwardly of said wheel unit selectively to an inner position and an outer position and urged toward 3,528,083

(3)

said outer position by spring tension, (e) an elongated latch element connected to the inner surface of said elongated spring actuated member and extending inwardly of said sleeve-like member, (f) there being a passageway through said sleeve-like member for receiving said elongated latch element, (g) a hook-like member carried by the inner end of said elongated latch element disposed to slidably and releasably engage said pressure actuated movable element holding said spring actuated member at said inner position under spring tension and releasable upon a predetermined change in pressure in said tire to move said pressure actuated movable element to a position to release said spring actuated member for outward movement, and (h) a signal actuating device carried by the vehicle in position to be engaged by said spring actuated member upon outward movement thereof whereby said signal actuating device is actuated upon said predetermined change in pressure within said tire.

This certificate supersedes Certificate of Correction issued April 13, 1971.

Signed and sealed this 20th day of July 1971.

(SEAL)
Attest:

EDWARD M. FLETCHER, JR.
Attesting Officer

WILLIAM E. SCHUYLER, JR.
Commissioner of Patents